(12) United States Patent
Jagannath et al.

(10) Patent No.: US 11,490,273 B2
(45) Date of Patent: Nov. 1, 2022

(54) TRANSCEIVER WITH MACHINE LEARNING FOR GENERATION OF COMMUNICATION PARAMETERS AND COGNITIVE RESOURCE ALLOCATION

(71) Applicant: ANDRO Computational Solutions, LLC, Rome, NY (US)

(72) Inventors: Jithin Jagannath, Oriskany, NY (US); Anu Jagannath, Oriskany, NY (US); Andrew Louis Drozd, Rome, NY (US)

(73) Assignee: ANDRO Computational Solutions, LLC, Rome, NY (US)

( * ) Notice: Subject to any disclaimer, the term of this patent is extended or adjusted under 35 U.S.C. 154(b) by 7 days.

(21) Appl. No.: 17/245,156

(22) Filed: Apr. 30, 2021

(65) Prior Publication Data

US 2021/0345132 A1 Nov. 4, 2021

Related U.S. Application Data

(60) Provisional application No. 63/017,745, filed on Apr. 30, 2020.

(51) Int. Cl.
*H04W 24/02* (2009.01)
*H04W 72/08* (2009.01)

(52) U.S. Cl.
CPC .......... *H04W 24/02* (2013.01); *H04W 72/085* (2013.01)

(58) Field of Classification Search
CPC ..... H04W 24/02; H04W 24/04; H04W 72/08; H04W 72/085
See application file for complete search history.

(56) References Cited

U.S. PATENT DOCUMENTS

| | | | | |
|---|---|---|---|---|
| 2021/0286270 | A1* | 9/2021 | Middlebrooks | G06N 20/00 |
| 2021/0344745 | A1* | 11/2021 | Mermoud | H04L 41/147 |
| 2022/0038902 | A1* | 2/2022 | Mueck | G06F 21/57 |
| 2022/0207425 | A1* | 6/2022 | Nakae | G06N 20/00 |

* cited by examiner

*Primary Examiner* — Thanh C Le
(74) *Attorney, Agent, or Firm* — Hoffman Warnick LLC

(57) ABSTRACT

Embodiments of the disclosure provide a system for operating a radio frequency (RF) network having a plurality of communication nodes. A network transceiver communicates with communication nodes in the RF network. A computing device coupled to the network transceiver performs actions including: evaluating a state of the RF network using a machine learning model, based on a spectrum environment and a communication objective, generating a set of communication parameters based on the state of the RF network, causing the network transceiver to communicate with the a communication node using the generated set of communication parameters, and modifying the machine learning model based on a result of causing the network transceiver to communicate with the communication node.

20 Claims, 9 Drawing Sheets

TRANSCEIVER WITH MACHINE LEARNING FOR GENERATION OF COMMUNICATION PARAMETERS AND COGNITIVE RESOURCE ALLOCATION

STATEMENT REGARDING FEDERAL RIGHTS

This invention was made with government support under contract number W15P7T-20-C-0006 awarded by the United States Department of Defense. The government has certain rights in the invention.

BACKGROUND

1. Technical Field

The present disclosure relates to transceivers with components (e.g., software defined radio (SDR)) for communication over a wireless network. More specifically, embodiments of the disclosure provide a system, method, and program product for providing a transceiver with machine learning for dynamic allocation of resources.

2. Background Art

With the recent advancements in various types of machine learning such as deep reinforcement learning, artificial neural network (ANN) based reinforcement learning solutions, etc., the ability to provide increased autonomy in a number of software and robotics applications has become a realization. An example of such an application is a transceiver system. Software defined radio (SDR) systems are an example of a transceiver system. SDR is a type of radio communication system where components that have been traditionally implemented in hardware (e.g. mixers, filters, amplifiers, modulators/demodulators, detectors, etc.) are instead implemented by means of software on a personal computer or embedded system. SDR may be used in tactical radios in combat or reconnaissance scenarios. Tactical radios are often confronted with hostile jamming and eavesdropping to disrupt the military command and control (C2) and situational awareness (SA). Conventional tactical radios that use SDR solutions are susceptible to jamming, and this weakness may be particularly troublesome in scenarios where several tactical radios are being deployed.

SUMMARY

The illustrative aspects of the present disclosure are designed to solve the problems herein described and/or other problems not discussed.

Embodiments of the disclosure provide a system for operating a radio frequency (RF) network having a plurality of communication nodes, the system including: a network transceiver configured to communicate with at least one of the plurality of communication nodes in the RF network; a computing device operatively coupled to the network transceiver, and configured to perform actions including: evaluating, via a machine learning model, a state of the RF network based on a spectrum environment and a communication objective, generating a set of communication parameters based on the state of the RF network, causing the network transceiver to communicate with the at least one of the plurality of communication nodes using the generated set of communication parameters, and modifying the machine learning model based on a result of causing the network transceiver to communicate with the at least one of the plurality of communication nodes.

Further embodiments of the disclosure provide a method for operating a radio frequency (RF) network having a plurality of communication nodes, the method including: evaluating, via a machine learning model, a state of the RF network based on a spectrum environment and a communication objective, wherein the network transceiver is configured to communicate with at least one of the plurality of communication nodes in the RF network, generating a set of communication parameters based on the state of the RF network; causing the network transceiver to communicate with the at least one of the plurality of communication nodes using the generated set of communication parameters; and modifying the machine learning model based on a result of causing the network transceiver to communicate with the at least one of the plurality of communication nodes.

Additional aspects of the disclosure provide a program product for operating a radio frequency (RF) network having a plurality of communication nodes, the computer program product including a computer readable storage medium on which is stored program code for causing a computer system to perform actions including: evaluating, via a machine learning model, a state of the RF network based on a spectrum environment and a communication objective, wherein the network transceiver is configured to communicate with at least one of the plurality of communication nodes in the RF network, generating a set of communication parameters based on the state of the RF network; causing the network transceiver to communicate with the at least one of the plurality of communication nodes using the generated set of communication parameters; and modifying the machine learning model based on a result of causing the network transceiver to communicate with the at least one of the plurality of communication nodes.

DETAILED DESCRIPTION

Figure 1:
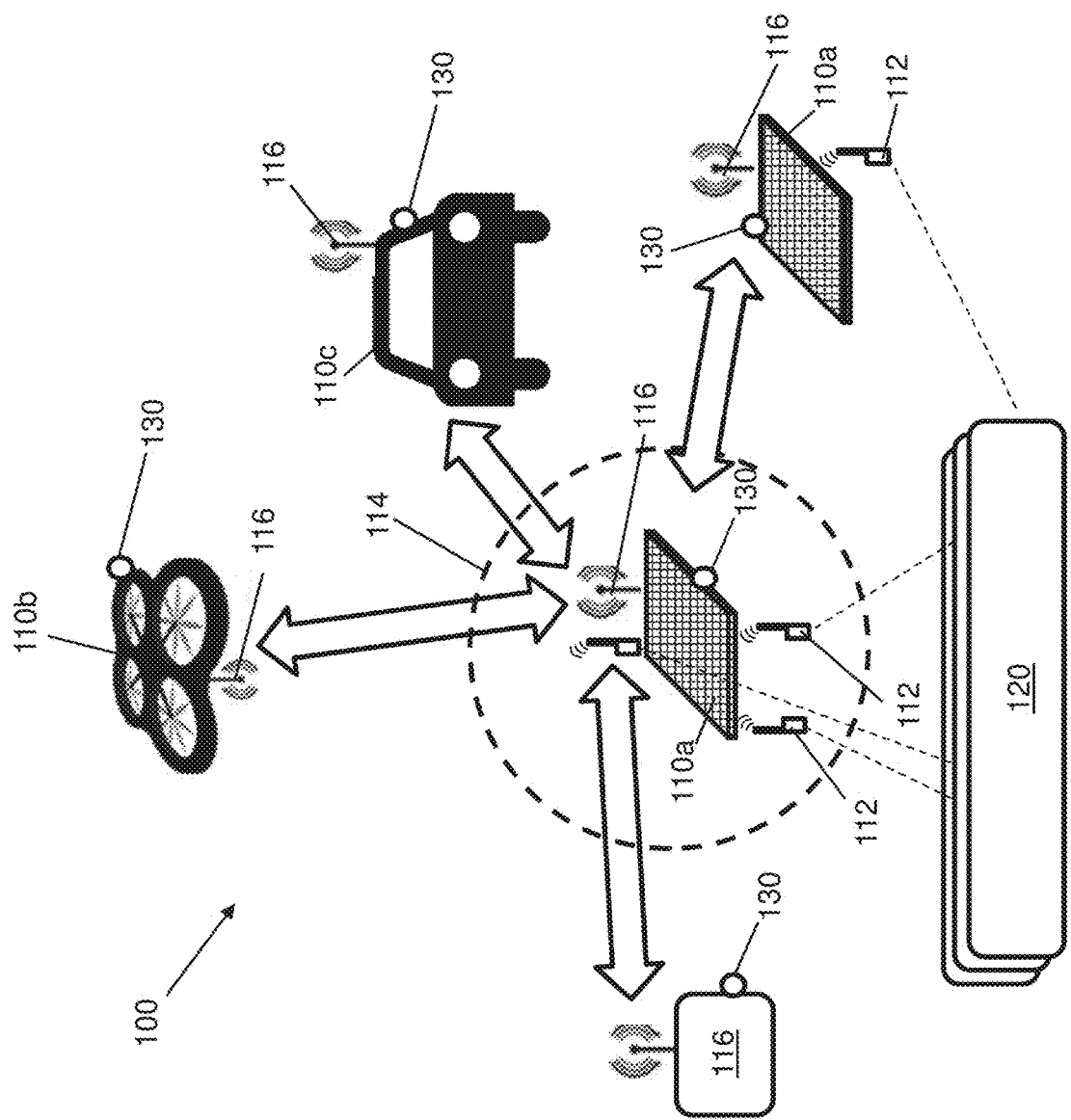
FIG. 1 shows a schematic view of a radio frequency (RF) network according to embodiments of the disclosure.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Embodiments of the disclosure provide a system, method, and program product for implementing a transceiver with machine learning to allocate radio resources in changing circumstances. Embodiments of the disclosure may provide a software defined radio (SDR) platform to provide, e.g., intelligent power control for cooperative spectrum sharing, joint power and frequency control, etc. Systems according to the disclosure include machine learning features through advanced artificial intelligence (AI), which may be capable of learning and adapting to a wide variety of operational scenarios.

Embodiments of the disclosure provide a system to operate an RF network having several communication nodes. A network transceiver may be configured to communicate with at least one communication node in the RF network. The transceiver may be one of the communication nodes, or may be a separate device. A computing device, operatively coupled to the network transceiver, may control RF transmissions to or from the network transceiver based on situational criteria. For instance, the computing device may evaluate the state of the RF network via a machine learning model. The state of the RF network may be evaluated based on a spectrum environment for communicating via the network transceiver, and/or one or more communication objectives. The computing device then may generate a set of communication parameters based on the state of the RF network, e.g., as an output form the machine learning model. The network transceiver thereafter may communicate with one or more communication nodes using the set of communication parameters. The computing device may also modify the machine learning model, e.g., based on the results of causing the network transceiver to communicate with one or more of the communication nodes.

Tactical contested environments are often presented with hostile jamming, neutral multisystem interference from the various subsystems onboard tactical vehicles, battalion level transmissions from nearby units, etc. Commercial cellular networks and ad hoc networks too face congested and contested operating conditions due to increased adoption of cellular user equipment, Internet of Things (IoT) devices in smart industrial operation, smart city, smart grid, etc. This not only presents a spectrum crunch bottleneck, but link breakage in the operational frequency. Software defined radio (SDR) is one setting where embodiments of the disclosure may be implemented. Software defined radios (SDRs) that are agile and adaptable in the operating frequency, power levels, adaptable waveforms etc., renders them as a ubiquitous platform for future intelligent networking. The high node density, spectrum crunch, possible stealth operation requirements, etc., present numerous operation variables that are beyond the capability of conventional adaptive solutions. Machine Learning (ML) has proven its potential to outperform human cognition in a variety of settings, presenting the immense and diverse capabilities of ML.

Referring to FIG. 1, a schematic view of a radio frequency (RF) network 100 is shown according to embodiments of the disclosure. RF network 100 may include multiple communication nodes in the form of transceivers 110, one or more of which may be embodied as, or may include, a transceiver assembly. Each transceiver 110 may be separately identified via a predetermined category such as a stationary (i.e., non-moveable) transceiver 110a, an aerial transceiver 110b, or a vehicle-based transceiver 110c. However embodied, each communication node 110 may represent a single communications node of RF network 100 capable of communicating with other communication nodes 110 and/or other components of RF network 100 as noted herein. Transceiver(s) 110 in one example may be configured for wireless radio frequency (RF) communication over some or all of the geographic area where RF network 100 is used. Each transceiver 110 thus may be in a same environment, or in some cases may be located in different environments.

Each communication node 110 may include wireless fidelity (Wi-Fi) hardware for enabling communication with and/or between local area network (LAN) devices within a single LAN area 114. Although one LAN area 114 is shown in FIG. 1, it is understood that each individual communication node 110 may generate a respective LAN area 114. Wi-Fi infrastructure may be particularly suitable for creating LAN area 114 for communication node 110, as Wi-Fi offers a mid-sized network area (i.e., up to approximately three-hundred foot radius) for interconnecting LAN devices 112. Each communication device may include, e.g., a long-range transceiver 116 for establishing communication between communication nodes 110 of RF network 100. In some cases, long-range transceiver 116 and/or a portion of communication node 110 may act as a short-range transceiver for permitting communication between LAN devices 112 within LAN area 114. In any case, long-range transceiver 116 may be provided in the form of an RF antenna, and/or any conceivable long-range transmission components (including RF hardware and/or other types of communication infrastructure) for transmitting data packets between communication devices 10 via RF network 100, and RF network 100 in turn may be a low-power wide-area network (LPWAN). According to one example, the LPWAN may be provided via the LoRaWAN™ specification or other proprietary, commercially available technology for wireless data communication. However embodied, long-range transceiver(s) 116 may enable low power, long range links to form RF network 100 by cooperation between communication nodes 110 and/or respective long-range transceivers 116. For this reason, each communication node 110 may be in a fixed position (i.e., "static") and mounted at the fixed position, and/or may be provided as part of one more mobile devices and/or components. However embodied, RF network 100 may be scalable, i.e., sized based on the number of communication nodes 110 and/or other communications hardware in communication with each other.

As noted elsewhere herein, each communication node 110 may take a variety of forms. Communication node 110 may include, e.g., a stationary transceiver 110a. Stationary transceiver(s) 110a in some cases may embody a majority of communication devices in one RF network 100. Stationary transceiver(s) 110a may operate in a fixed, or at least relatively fixed, location such as a household, hospital, roadside assembly, and/or other buildings without significant mobility. Stationary transceivers 110a may include or otherwise be coupled to one or more power sources for enabling operation of stationary transceivers(s) 110*a* without reliance on a conventional power grid or similar infrastructure. In an example, stationary transceivers(s) 110*a* may include or otherwise be coupled to a generator, battery, solar panel, wind turbine, and/or other power source for providing electrical energy on command. Where only temporary network accessibility is required (e.g., only a few minutes or hours), stationary transceiver 110*a* may offer smaller size and/or limited portability by changing the type of applicable power source.

Stationary transceiver(s) 110*a* may serve as a primary source of cached information (maps, emergency phone numbers etc.). Stationary transceiver(s) 110*a* may be capable of data caching to reduce transmission load, delays and energy consumption of the network. As noted herein, stationary transceiver(s) 110*a* may be capable of generating a LAN (e.g., via Wi-Fi) where LAN devices 112 (e.g., phones, tablets, PC or Laptops) can connect to RF network 100. In this case, stationary transceiver(s) 110*a* act as an access point for devices to communicate among themselves, and/or other users.

RF network 100 may also include one or more aerial transceivers 110*b*. Aerial transceivers 110*b* may allow for portions of RF network 100 to travel to and/or operate within various locations, regardless of existing infrastructure. Aerial transceivers 110*b* may allow for communication to one or more stationary transceivers 110*a* that otherwise cannot be reached through other stationary transceivers 110*a* of RF network 100.

RF network 100 may also include one or more vehicle-based transceivers 110*c*. Although one vehicle-based transceiver 110*c* is shown in FIG. 1 for the sake of example, it is understood that multiple vehicle-based transceivers 110*c* may be included in one RF network 100. It is also understood that one or more aerial transceivers 110*b* also may be designated as vehicle-based transceivers, e.g., by being capable of aerial travel. According to an example, vehicle-based transceiver 110*c* may be provided as one or more radio units carried by consumers, personnel operating in a mission area, etc. Vehicle-based transceivers 110*c* do not necessarily require an independent or dedicated power source, and may rely on the vehicle itself to drive the operation of vehicle-based transceiver 110*c*.

Transceiver(s) 110, 116 may include or otherwise may be coupled to a computing device 120 for managing (e.g., setting, modifying, etc.) various communication parameters for sending and receiving communications through each node within RF network 100. Such parameters may include transmission frequencies, waveforms, powers, destinations, and/or other settings as discussed herein. Embodiments of the disclosure use machine learning of RF network 100 properties to automatically update transceiver 110, 116 operations in compliance with communication objectives for user(s) of RF network 100, e.g., maintaining connectivity between certain transceiver(s) 110, 116 and/or prioritizing traffic between certain devices in RF network 100. Transceiver(s) 110, 116 may include one or more sensor(s) 130 for monitoring the state of RF network 100 and/or various other properties such as available frequencies, network infrastructure, etc. The term "state," as used herein, refers to a comprehensive set (e.g., a matrix) of inputs combining multiple attributes of RF network 100, including observable communication properties (e.g., communication frequencies, bandwidths, device names, device types, serial numbers, environmental attributes etc.) and user determined properties (e.g., current task(s) being undertaken by transceiver(s) 110, 116 in RF network 100). Machine learning models according to the disclosure may be configured to receive and process state as a multivariate input. Sensor(s) 130 may be directly mounted on transceiver(s) 110, 116, or otherwise may be in communication with one or more computing devices 120 for governing the operation of transceiver(s) 110, 116 in RF network 100. In the event that sensor(s) 130 are mounted on transceiver(s) 110, 116, sensor(s) 130 may be positioned on, within, and/or otherwise may be at any location suitable to monitor, various aspects of RF network 100 during operation. Sensor(s) 130 can be provided in the form of any currently known or later-developed instrument for detection and/or analysis of an RF network environment, and as examples may include spectrum analyzers, radio frequency sensors, heat based sensors, electrical sensors, and/or any conceivable number or type of operational detection and/or analysis instruments. Each sensor 130 can be configured to monitor the state of RF network 100 using only a subset of transceivers 110, 116, or otherwise may be configured to measure the spectrum environment and/or various other properties indicating the state of RF network 100. Additionally or alternatively, one or more of sensor(s) 130 may include other types of instrumentation configured to monitor other attributes of RF network 100 (e.g., location, time, temperature, proximity to other devices and/or networks, etc.)

RF network 100 may include one or more computing devices 120, each of which may include a processor, memory, and/or other components for implementing actions to operate RF network 100. Although computing device(s) 120 are shown by example in FIG. 1 as being separate components from transceiver(s) 110, 116, one or more of computing device(s) 120 may be included within transceiver(s) 110, 116 and/or other components/devices discussed herein as being part of RF network 100 (e.g., aerial transceivers 110*b*, vehicle transceivers 110*c*, LAN devices 112, etc.).

Figure 2:
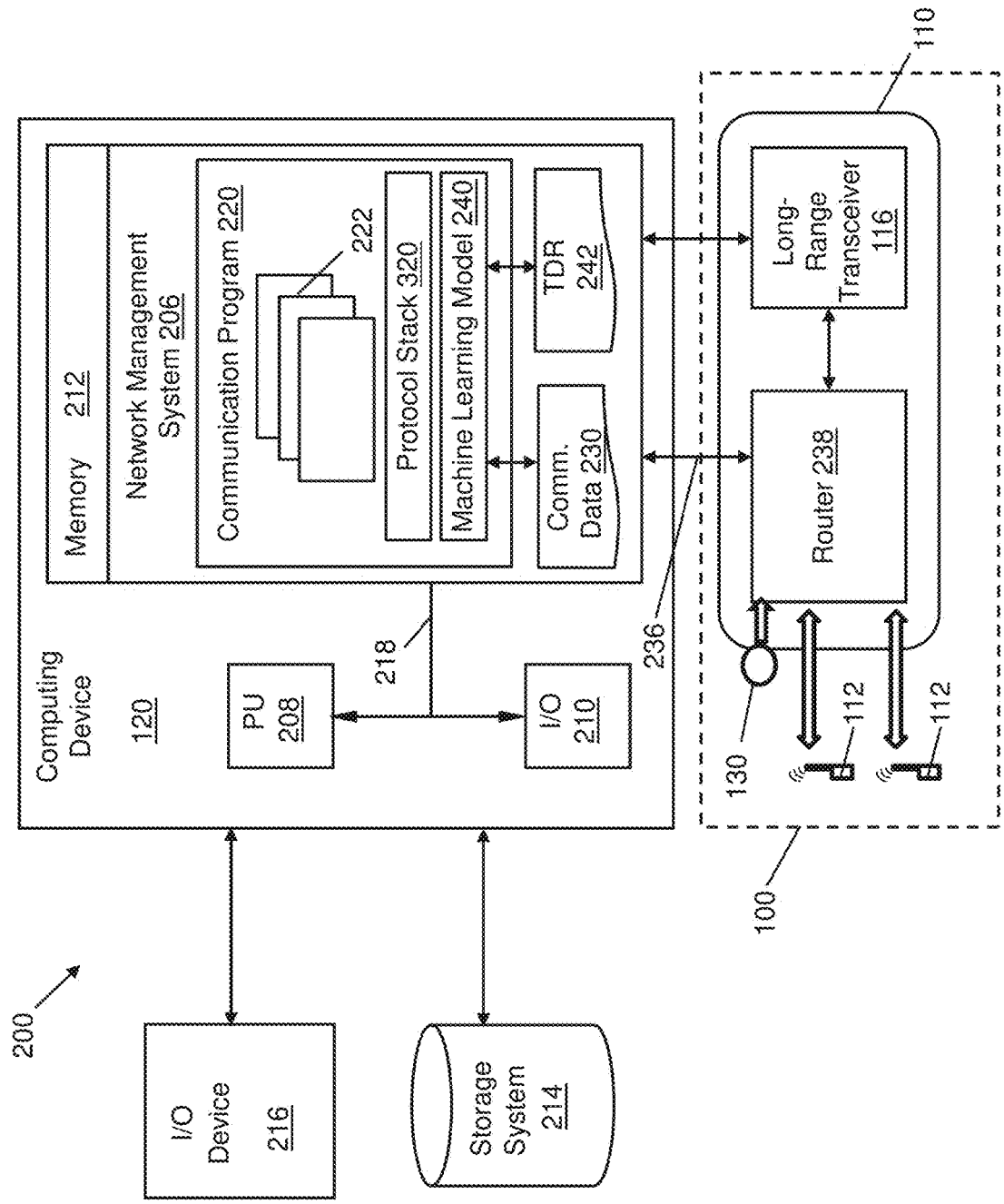
FIG. 2 shows an illustrative environment for implementing a system, method, or program product according to embodiments of the disclosure.

Turning now to FIG. 2, an illustrative system 200 for implementing the methods and/or systems described herein is shown. In particular, computing device 120 can include, e.g., a network management system 206 which may include, e.g., one or more sub-systems (communication program 220 described herein) for performing any/all of the processes described herein and implementing any/all of the embodiments described herein.

Computing device 120 is shown including a processing unit (PU) 208 (e.g., one or more processors), an I/O component 210, a memory 212 (e.g., a storage hierarchy), an external storage system 214, an input/output (I/O) device 216 (e.g., one or more I/O interfaces and/or devices), and a communications pathway 218. In general, processing unit 208 can execute program code, such as network management system 206, which is at least partially fixed in memory 212. While executing program code, processing unit 208 can process data, which can result in reading and/or writing data from/to memory 212 and/or storage system 214. Pathway 218 provides a communications link between each of the components in system 200. I/O component 210 can comprise one or more human I/O devices, which enable a human user to interact with computing device 120 and/or one or more communications devices to enable a system user to communicate with the computing device 120 using any type of communications link. To this extent, network management system 206 can manage a set of interfaces (e.g., graphical user interface(s), application program interface(s), etc.) that enable system users to interact with network management system 206. Further, network management system 206 can manage (e.g., store, retrieve, create, manipulate, organize, present, etc.) data, through several modules contained within communication program 220 (i.e., modules 222). Communication program 220 is shown by example as being a sub-systems of network management system 206. However, it is understood that communication program 220 in some cases may be a wholly independent system. Memory 212 of computing device 120 is also shown to include a hardware interface 236 for translating outputs from network management system 206 into actions performed in RF network 100, though it is understood that hardware interface 236 may be included within one or more independent computing devices, programs, etc., in alternative embodiments.

As noted herein, network management system 206 can include communication program 220. In this case, various modules 222 of communication program 220 can enable computing device 120 to perform a set of tasks used by network management system 206, and can be separately developed and/or implemented apart from other portions of network management system 206. Memory 212 can thus include various software modules 222 configured to perform different actions. Example modules can include, e.g., a comparator, a calculator, a determinator, etc. One or more modules 222 can use algorithm-based calculations, look up tables, software code, and/or similar tools stored in memory 212 for processing, analyzing, and operating on data to perform their respective functions. Each module 222 discussed herein can obtain and/or operate on data from exterior components, units, systems, etc., or from memory 212 of computing device 120.

Modules 222 of communication program 220 can perform functions of computing device 120 in various implementations. Communication program 220 can include, e.g., modules 222 for evaluating the state of RF network 100 based on a spectrum environment of RF network 100, and one or more communication objectives for transceiver(s) 110, 116 within RF network 100. The spectrum environment may be expressed as part of communications data 230, and may include measured available frequency ranges, frequency ranges currently in use, available bandwidth, types of transceiver(s) 110, 116 in RF network 100, serial numbers and/or other identifying information for transceiver(s) 110, 116, etc. Communication objectives similarly may be stored in communications data 230 of memory 212, and may include, e.g., short term goals (e.g., transmitting a specific data packet or groups of data packets from one or more transceivers 110, 116 to one or more other transceivers 110, 116, locating certain transceivers 110, 116 within RF network 100, etc.), long term goals (e.g., maintaining a target data bandwidth between two or more transceivers 110,116 within RF network 100, maintaining the operation of transceiver(s) 110, 116 within RF network etc.), and/or other goals including user objectives and/or automatically determined objectives for RF network 100. Modules 222 of communication program 220 may use these types of communication data 230 and/or other data within memory 212 or storage system 214 to generate communication parameters (e.g., transmission frequency, transmission waveform, transmission power, data destination, data rate, etc., for transceiver(s) 110, 116, etc.) through a machine learning model 240. Modules 222 additionally may cause transceiver(s) 110, 116 to communication with communication nodes in RF network 100 (e.g., other transceiver(s) 110, 116) using the generated communication parameters. Various aspects of the communication parameters and/or their effect on RF network 100 may be stored as part of communication data 230 to influence further instances of generating communication parameters for RF network 100.

The various inputs that modules 222 may use for generating communication parameter(s) and/or further modifying machine learning model 240 can be provided to computing device 120, e.g., through I/O device 216. Some inputs concerning RF network 100 can be converted into a data representation (e.g., a data matrix with several values corresponding to particular attributes) and stored electronically, e.g., within memory 212 of computing device 120, storage system 214, and/or any other type of data cache in communication with computing device 120. Measurements from sensor(s) 130 pertaining to RF network 100, can additionally or alternatively be converted into data inputs or other inputs to network management system 206 with various scanning or extracting devices, connections to independent systems, and/or manual entry by user(s) 122. Such data can be stored in memory 212 and/or storage system 214, e.g., as communications data 230. Memory 212 may also include a training data repository ("TDR") 242 accessible by machine learning model 240. TDR 242 may include the same or similar data as communications data 230, and in some implementations TDR 242 may include communications data 230 as a sub-field therein or vice versa. Any data submitted to and/or included within TDR 242 may originate from other instances of operating transceiver(s) 110, 116, other missions performed in RF network 100, and/or predicted communications settings for known or predicted spectrum environments and/or communication objectives. TDR 242 also may include, e.g., data pertaining to the movement and/or trajectory of transceiver(s) 110, 116, technical data of transceiver(s) 110, 116 such as remaining power and/or communication frequencies, and/or various aspects of other transceiver(s) 110, 116 within RF network 100 (e.g., vehicle serial numbers, personnel name and position, infrastructure status, etc.). Machine learning model 240 can use TDR 242 to generate communication settings for transceiver(s) 110, 116 and transmit such settings to transceiver(s) 110, 116, e.g., via hardware interface 236 within transceiver 110 116 and/or a communications link to router(s) 238 where applicable. TDR 242 and/or network management system 206 can thereafter receive responsive data via sensor(s) 130 and/or communications from other transceiver(s) 110, 116, allowing network management system 206 to update machine learning model 240 based on subsequently received data.

As discussed herein, network management system 206, including machine learning model 240, can generate new or adjusted communications settings to control further operation of transceiver(s) 110, 116. As described elsewhere herein, machine learning model 240 can include multiple layers of models, calculations, etc., each including one or more adjustable calculations, logical determinations, etc., through any currently-known or later developed analytical technique for predicting an outcome based on raw data. Machine learning model 240 can therefore use various types of data in TDR 242, e.g., a catalogue of past inputs and/or similar inputs archived in TDR 242. TDR 242 additionally or alternatively may include initial models to be modified, trained, and/or otherwise used as a reference for generating and/or selecting between communication settings, as well as for further adjusting of machine learning model 240 as discussed herein. Example processes executed with machine learning model 240 and/or network management system 206 are discussed in detail elsewhere herein. Modules 222 of communication program 220 can implement one or more mathematical calculations and/or processes, e.g., to execute the machining learning and/or analysis functions of machine learning model 240.

Computing device 120 can be operatively connected to or otherwise in communication with transceiver(s) 110, 116, as part of the communication program 220 for control of transceiver(s) 110, 116. Computing device 120 can thus be embodied as a unitary device coupled to transceiver(s) 110, 116 and/or other devices, or can be multiple devices each operatively connected together to form computing device 120.

Embodiments of the present disclosure may include using machine learning model 240 to generate communication settings, based on the state of RF network 100 including a spectrum environment and/or communication objective(s). As discussed herein, embodiments of the present disclosure thereby provide machine learning processes for control of transceiver(s) 110, 116 by periodically or continuously monitoring the state of RF network 100.

Where computing device 120 comprises multiple computing devices, each computing device may have only a portion of network management system 206 and/or communication program 220 fixed thereon (e.g., one or more modules 222). However, it is understood that computing device 120 and communication program 220 are only representative of various possible equivalent computer systems that may perform a process described herein. Computing device 120 can obtain or provide data, such as data stored in memory 212 or storage system 214, using any solution. For example, computing device 120 can generate and/or be used to generate data from one or more data stores, receive data from another system, send data to another system, etc.

Figure 3:
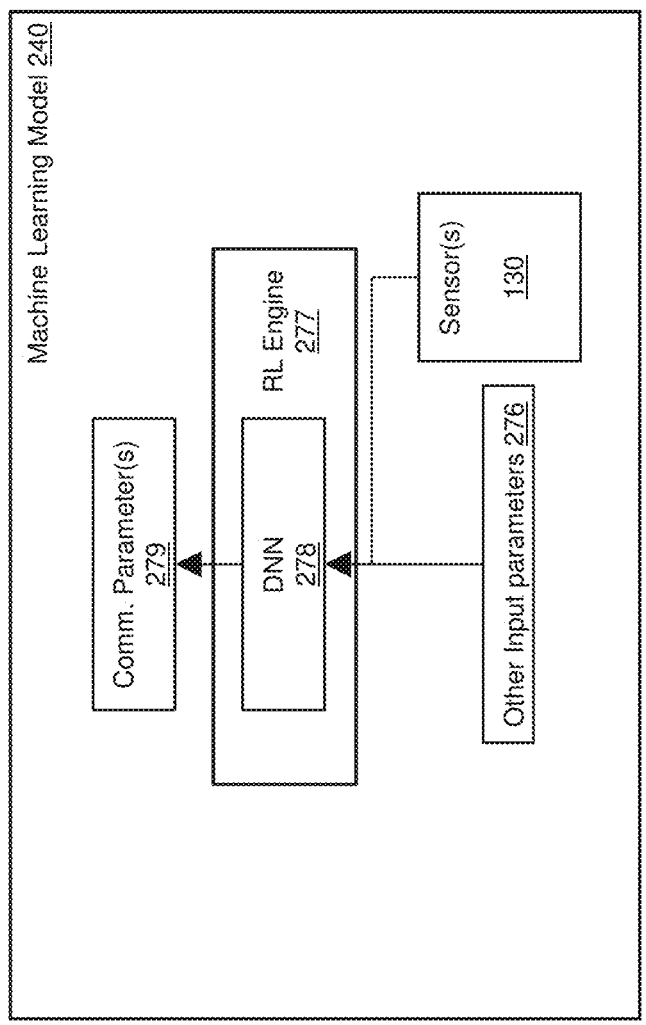
FIG. 3 shows a schematic diagram of a learning architecture integrated with an external software framework according to embodiments of the disclosure.

Turning to FIG. 3, various functions of computing device 120 may be implemented via a machine learning model 240 (e.g., any mathematical or algorithmic object capable of estimating an unknown function). A neural network is one example of a component that may be implemented as machine learning model 240. Machine learning model 240 is shown via a schematic diagram to further illustrate processes for operating RF network 100 via transceiver(s) 110, 116 according to the disclosure. Machine learning model 240 can relate one or more input variables (e.g., an initial model 276 contained within, e.g., a library of training data) to various actions to be performed via, e.g., transceiver(s) 110, 116. Initial model(s) 276 may represent initial communication parameters to be implemented in RF network 100 via transceiver(s) 110, 116, and/or modified versions of initial communication parameters, which such modifications being produced from past instances of operating transceiver(s) 110, 116 and/or other devices in RF network 100. As initial model(s) 276 is/are submitted to machine learning model 240, algorithms included in machine learning model 240 can be iteratively adjusted in a reinforcement learning engine (RL engine) 277 based on comparing various outputs (e.g., communication parameter(s) 279) to verified, ideal values and/or other related groups of inputs and outputs (e.g., data produced from undertaking other missions within RF network 100, other operations performed by transceiver(s) 110, 116, etc.). RL engine 277 may include a deep neural network 278 for further modeling of non-linear relationships (e.g., the inputs defining the state of RF network 100 to communication parameters 279), for deeper processing and modeling of RF network 100 during operation.

Inputs to machine learning model 240 may include, e.g., input(s) provided via user(s), various quantities detected via sensor(s) 130, and/or various internally sensed parameters of transceiver(s) 110, 116. Any inputs other than those received from sensor(s) 130 are designated as other input parameters 276. DNN 278 maps the inputs (i.e., data from sensors 130 and/or other input parameters 276) to a selected representation for RL engine 277 to process. DNN 278 may include a set of hidden layers for defining a non-linear relationship between the network status and communication objectives with the appropriate set(s) of communication parameters to be generated. DNNs differ from conventional artificial neural networks (ANNs) by their ability to generate a compositional model as its output. Thus, DNN 278 may enable a composition of features from lower layers, thus modeling complex data with fewer units than in similarly-structured shallow networks.

DNN 278 of RL engine 277 may interrelate various inputs to produce an output in the form of communication parameter(s) 279 to be implemented, e.g., via transceiver(s) 110, 116. Machine learning model 240 may receive various forms of data (e.g., communication data 230) from initial model 276, other sources from memory 212 and/or storage system 214, and/or directly from sensor(s) 130 as inputs for immediate processing as an input to DNN 278. However, it is understood that input(s) from sensor(s) 130 also may additionally or alternatively be included in hidden layers of DNN 278 in other implementations. In embodiments of the disclosure, communication parameters 279 from machine learning model 240 can include causing transceiver(s) 110, 116 to communicate with other devices in RF network 100, e.g., using specific frequencies, communication protocols or channels, communication times, etc.

Machine learning model 240 can take the form of any conceivable function approximator, and examples of such systems (e.g., DNNs) are described herein. Machine learning model 240 may include one or more sub-classifications of ANN architectures, whether currently known or later developed. In one example, machine learning model 240 can take the form of a "convolutional neural network," for predicting action(s) from initial model 276 and modification via environmental and/or non-environmental inputs. Convolutional neural networks may be distinguished from other neural network models, e.g., by including individual nodes in each layer which respond to inputs in a restricted region of a simulated space known as "a receptive field." The response of an individual node to inputs within its receptive field can be approximated mathematically by a convolution operation. In another example, machine learning model 240 can take the form of a multilayer perceptron (MLP) neural network. MLP neural networks may be distinguished from other neural networks, e.g., by their lack of restrictions on the interactions between hidden nodes and lack of parameter sharing. Neural networks may be particularly suitable for sets of data, which may be not linearly separable by conventional mathematical techniques. Other function approximation regimes include weighted linear/nonlinear Fourier basis or polynomial basis functions. Regardless of the chosen architecture of machine learning model 240, the various processes for training machine learning model 240 and/or expanding the information included in initial model(s) 276 and/or corresponding training data implemented with embodiments of the present disclosure can be similar or identical.

Figure 4:
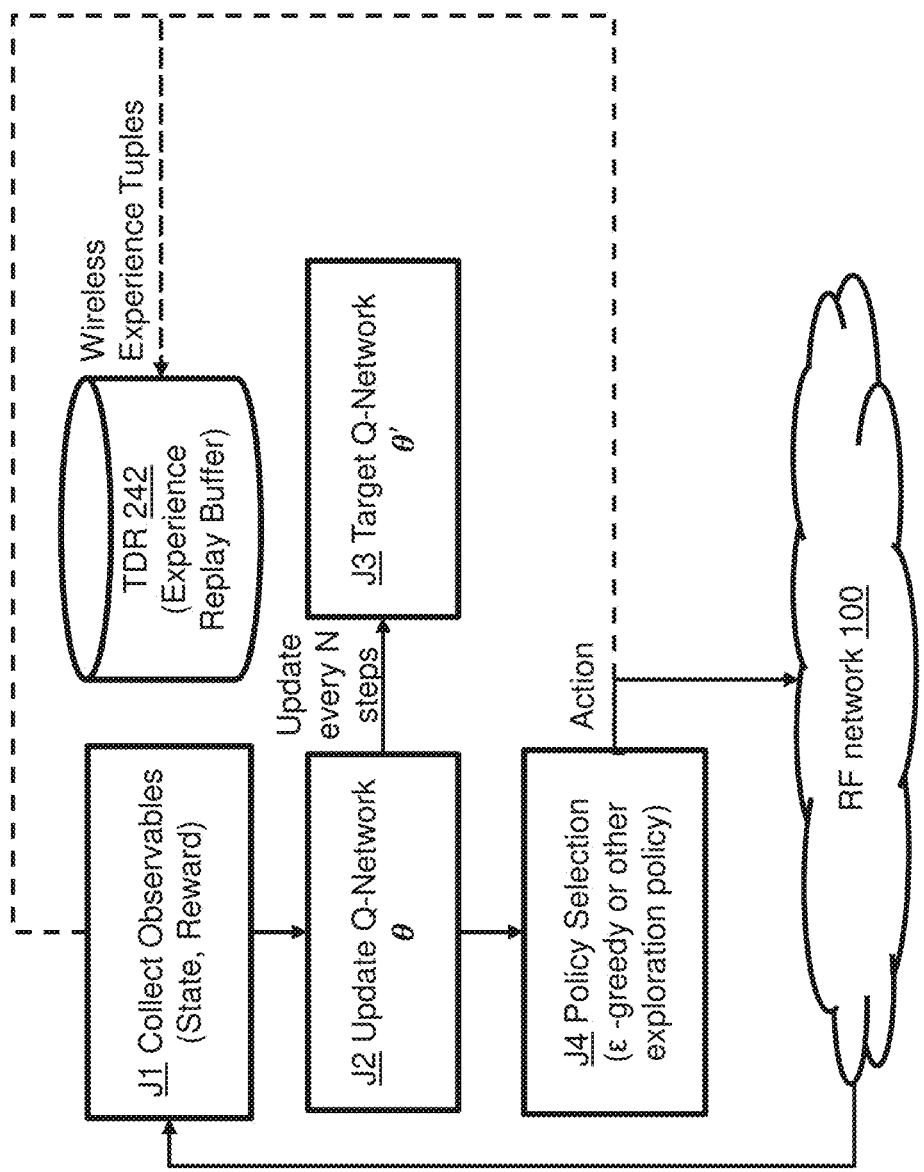
FIG. 4 shows a schematic diagram of a machine learning process in the form of a Q-learning approach according to embodiments of the disclosure.

Referring to FIGS. 2-4, some implementations of machine learning model 240 for RF network 100 may include various reinforcement learning (RL) features. FIG. 4 depicts an implementation of RL via a "Q-learning" methodology. Q-learning refers to a reinforcement learning algorithm to define the value of a given action in a particular state. In this case, a Q-learning methodology defines the value of certain communication parameters when RF network 100 is in a particular state. In such cases, a general model of RF network 100 does not need to be constructed. Traditionally, Q-learning approaches use a Q-table to store various state-action pairs which will grow with the cardinality of the state-action spaces. The state space of such an optimization will scale with number of local neighbors (i.e., transceivers 110, 116) in a vicinity within RF network 100. In the example of a dense military deployments involving as many as, e.g., around 3750 soldiers grouped into several battalions, or in dense IoT applications as envisioned for 5G networks and beyond, the state space of the distributed approach will surpass typical system capabilities. However, dimensionality of a Q-learning approach prohibits a more comprehensive representation of the dynamic network states. Using deep reinforcement learning (DRL) to represent large state-action spaces and the performance improvement emerging from such holistic representation enables the use of a DRL approach to perform distributed transmission power control in RF network 100.

In process J1, the observable quantities sensed for RF network 100 (e.g., via sensor(s) 130) with respect to particular transceiver(s) 110, 116 in RF network 100 are collected, and may denote the state of particular communication nodes. The state(s) may be reflected in machine learning model 240 and/or TDR 242 and may include parameters such as, e.g., local information of the agent such as the sensed spectrum (frequency, interference, signal strength), number of radios (neighbors) in hearing range, estimated interference caused by the agent to its neighbors, distance to particular neighbors, relevant packet(s) in a data buffer, etc. Such attributes may be sensed parameters observed through sensor(s) 130, recorded in TDR 242 and/or may be include network parameters obtained directly from a protocol stack of transceiver(s) 110, 116 (i.e., protocol stack 320 in FIG. 4, discussed herein). Sensed parameters may include one or more of, e.g., projected signal-to-interference-plus-noise-ratio (SINR), interference caused to at least one of the plurality of communication nodes in the RF network, a received signal strength, or a queue backlog for at least one of the plurality of communication nodes in RF network 100.

However obtained, These and/or other observables may define the state space "S," made up of various possible states "s" that RF network 100 and/or communication nodes such as transceiver(s) 110, 116 can be in. Hence, machine learning model 240 can exploit reinforcement learning methods such as deep Q-learning, Monte-Carlo policy gradient method, state-action-reward-state-action (SARSA) approaches, actor-critic approaches, etc., to adapt, self-learn, and operate in an autonomous or semi-autonomous manner with minimal or without involvement of operators (e.g., users of RF network 100 and/or its various communication nodes).

With continued reference to FIG. 4, machine learning model 240 may provide a deep Q-learning model with experience replay, whereby transceiver(s) 110, 116 act(s) as decision agents for radio transmission decisions to achieve communication objectives, by adapting to the wireless environment in RF network 100. The observables of the environment (e.g., provided in a protocol stack) collected in process J1 at an instant "t" denoted as "$s_t$," affects transceiver(s) 110, 116 decision-making process. Transceiver(s) 110, 116 may, based on machine learning model 240 with deep Q-learning with experience replay, take an action "$a_t$," transitioning the transceiver(s)'s 110, 116 radio system into next state "$s_{(t+1)}$." In response, transceiver(s)'s 110, 116 learning algorithm credits it a reward/penalty "$r_t$," for making the transition from $s_t$ to $s_{(t+1)}$ by the action $a_t$. Here, to perform adaptive radio deep Q-learning, machine learning model 240 may use a deep neural network (DNN) to perform function approximation of the relevant value functions. The DNN used for function approximation of the Q-values may be known as the "Q-network." The transceiver(s)'s 110, 116 choice of action could be based on a $\varepsilon$-greedy policy whereby such that a random action is drawn with probability $\varepsilon$ and the action with highest Q-value (from Q-network with parameters $\theta$) is chosen with probability 1−$\varepsilon$. Transceiver(s) 110, 116 thereafter may store the wireless experience tuple $<s_t, s_{(t+1)}, a_t, r_t>$ into the replay buffer "B" with memory "M." Replay buffer B may be included in TDR 242 in an example implementation, or otherwise may be stored elsewhere in memory 212 and/or storage device 213. As per the experience replay, machine learning model 240 in process J2 can sample a random mini batch "$B_{mini}$" of wireless experience tuples and update the target action value function (target network with parameters "$\theta'$"). A gradient descent calculation is performed on a loss function with respect to the Q-network with parameters $\theta$. The target network parameters are then reset every "N" instances in process J3, with N being used defined and/or automatically selected based on error calculations and/or other factors. Thereafter, the learning model may continue to process J4 of selecting a policy, based on a $\varepsilon$ greedy selection approach, and/or other exploration policy. The ensuing "action" in the form of generated communication parameters may then be issued to RF network 100 (e.g., to transceiver(s) 110, 116), and wireless experience tuples may be stored in TDR 242 and/or elsewhere in memory 212 or storage device 214 for use in future iterations.

Pruning is a further task to ensure that AI computations in machine learning model 240 are executable in real-time on embedded platforms, e.g., transceiver(s) 110, 116. During the pruning process, a machine learning model 240 can be trained to statistically analyze and rank the computational components in transceiver(s) 110, 116 (including, e.g., portions of a protocol stack) in terms of their importance to the overall calculation. The various layers, nodes, channels, or computations that are less impactful may be eliminated with little to no impact of the result. In addition, quantization techniques may be employed to reduce the number of compute operations without impacting the precision of the algorithm. Any DNN(s) employed for function approximation in the reinforcement learning algorithms can be pruned in this way for storage and computational ease, thus easing the operational burden (and thus processing power and/or energy consumed) by transceiver(s) 110, 116.

Directives from human operators, regardless of which part of an interface delivers them to transceiver(s) 110, 116, have the ability to change the communication parameters for transceiver(s) 110, 116 in RF network 100. Such changes may change the value signal that machine learning model 240 associates with certain communication setting(s) 279, thus signifying that computing device 120 must change the behavior of transceiver(s) 110, 116 to increase corresponding value functions. In this case, transceiver(s) 110, 116 will subsequently perform use the relevant communication parameter(s) 279.

Figure 5:
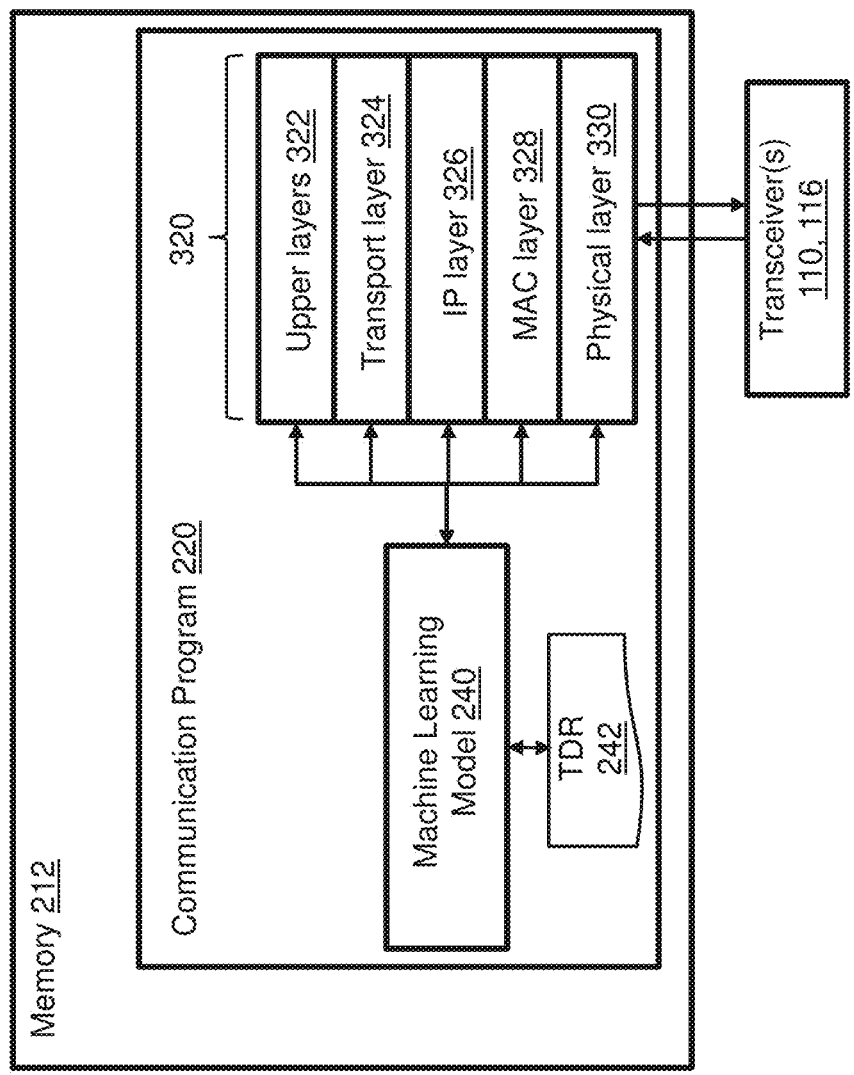
FIG. 5 shows a schematic diagram of a machine learning model for implementing various functions according to embodiments of the disclosure.

Referring now to FIGS. 2 and 5 together, in which FIG. 5 provides a schematic view of interaction between machine learning model 240 and a subset of communications data 230 in the form of a protocol stack 320, various implementations are described in further detail. Although the schematic view in FIG. 5 illustrates communication program 220 as being implemented separately from transceiver(s) 110, 116, this is solely for the sake of example; communication program 220 and/or computer system 120 in which it is provided may be subcomponents and/or implemented on transceiver(s) 110, 116 as discussed herein. According to an example, communication program 220 allows each transceiver 110, 116 in RF network to learn and characterize its environment from periodic/sporadic observations (e.g., through sensor(s) 130 where applicable) with the help of module(s) 222 and machine learning model 240. Modules 222 of communication program 220 may interact with (e.g., as shown in FIG. 5) machine learning model 240 to take studied actions. For instance, communication program 220 may be aware of the operational environment of RF network 100 from various perspectives, and may use learned observations to achieve its own application objectives at various points in time.

Communication program 220 may be flexibly structured to accommodate different applications and/or situations within RF network 100. For example, communication program 220 may prioritize certain objectives based on configurations such as a high data rate—deadline (latency) aware configuration; a low data rate delay tolerant periodic sensing configuration (e.g., for military communication scenarios); a delay sensitive very high data rate communication configuration (e.g., for a video streaming application), etc. An example of a military communication scenario could be blue-force or red-force tracking (i.e., BFT, RFT). Regardless of the particular application, machine learning model 240 may interface with data protocol stack 320 to characterize the environment where RF network 100 is provided. Such characterizations can be used to control further transmission between transceiver(s) 110, 116 by generating communication parameters as described herein.

Protocol stack 320 may be organized into several layers, e.g., reflecting various aspects of connecting transceiver(s) 110, 116 to other communication nodes in RF network 100. A set of upper layers 322 may include file transfer protocols (FTP) and/or protocol functions implemented at higher, more general levels of protocol stack 320. Transport layer 324 is a protocol architectures responsible for connection-oriented communications, and provides reliability, flow control, multiplexing, and/or related functions. Internet protocol (IP) layer 326 groups networking methods, protocols, and specifications in an internet protocol suite for corresponding transceiver(s) 110, 116. Protocol stack 320 also includes a medium access control (MAC) layer 328 for controlling hardware interaction with a corresponding transmission medium (e.g., wired or wireless connection interfaces). Protocol stack 320 also includes a physical layer 330, representing the hardware (e.g., chips within transceiver(s) 110, 116) responsible for transmitting bits over a physical data link. The protocol stack agnostic nature of machine learning model 240 will allow hardware interfacing with physical layer 330, in which case, machine learning model 240 may directly generate low probability of intercept (LPI)/low probability of detection (LPD) radio transmission parameters for resilient operation.

Each layer 322, 324, 326, 328, 330 of protocol stack 320 may provide operational information to machine learning model 240, which may use such information with TDR 242 and other information in memory 212 to implement functions discussed herein. Any parameters pertaining to protocol stack 320 may be known as and referred to as "network parameters" for transceiver(s) 110, 116. When interfaced with protocol stack 320 for networking intelligence, transceiver(s) 110, 116 can cooperate with machine learning model 240 to generate communication parameters, e.g., autonomously deciding network routes within RF network 100, controlling the packet rate for robust operation, and/or otherwise changing the actions undertaken in RF network 100.

During operation, machine learning model 240 may cause communication program 220 to adapt various communication parameters based on a reward/penalty methodology for chosen parameters with RF network 100 being a particular state, as in a reinforcement learning system. Communication program 220 thus may cause transceiver(s) 110, 116 to adapt to the spectrum environment of RF network 100 to achieve certain communication objectives. The learning methodology in machine learning model 240 could be carried out in a distributed manner (e.g., on multiple transceivers 110, 116), centralized (e.g., on one transceiver 110, 116), or in a hybrid manner (e.g., with certain transceivers 110, 116 predominantly performing certain operations and/or learning tasks) depending on the application at hand and considering the entailed communication overhead if any. Machine learning model 240, during operation, can be configured to control communication parameters (alternately known as radio transmission parameters) such as transmission power, transmission frequency, data destination, data rate, etc. Each transmission parameter can have discrete levels and may be drawn from a bounded set, e.g., in memory 212. Communication program causing transceiver(s) 110, 116 to use the chosen communication parameters from machine learning model 240 may be referred to as the "action" undertaken in a reinforcement learning setting. In this case, all possible values of each communication parameter define the action space "A" for RF network 100.

Figure 6:
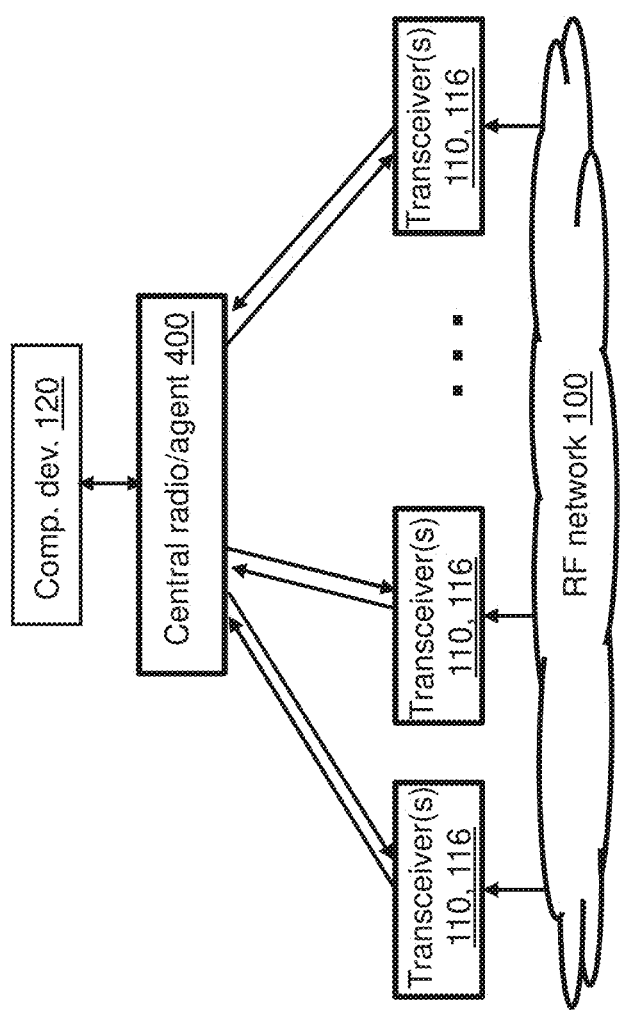
FIG. 6 shows a schematic diagram of interaction between various communication nodes according to embodiments of the disclosure.

Referring to FIGS. 2 and 6, embodiments of the disclosure can allow computing device 120 to interact with transceiver(s) 110, 116 in a centralized setting. In such a setting, a central radio or agent 400 (e.g., a base station with more computational power) including and/or in communication with computing device 120 may act as a global decision agent for RF network 100. Here, central radio/agent 400 may collect observations/experiences (e.g., from sensor(s) 130 and/or protocol stacks 320 (FIG. 4) thereon) from multiple (e.g., three or more as shown in FIG. 5) transceiver(s) 110, 116 in RF network 100. Embodiments which use central radio/agent 400 may be particularly suitable to a cellular network, where central radio/agent 400 is already designated as a centralized controller to collect local information via backhaul links from transceiver(s) 110, 116 in RF network 100 to generate communication parameters for each transceiver 110, 116.

Central radio/agent 400 can broadcast the generated communication parameters to each transceiver 110, 116, e.g., via RF network 100. Transceiver(s) 110, 116 then can analyze the environment of RF network 100 by adopting the ε-greedy policy as discussed herein, such that a random action is drawn with probability ε and the action broadcast by central radio/agent 400 is chosen with probability 1-ε. Such adaptive operation may further the general communication objectives of RF network 100, e.g., prioritizing certain communication routes and/or types, maintaining stability in certain areas, etc. Machine learning model 240 may remain flexible enough to adopt other policies or priorities, e.g., where noise is added to the generated communication settings and transceiver(s) 110, 116 modify their activity to account for such noise. In some cases, the communication objective may include several communication tasks, each of which may correspond to one of the various example tasks set forth herein.

Figure 7:
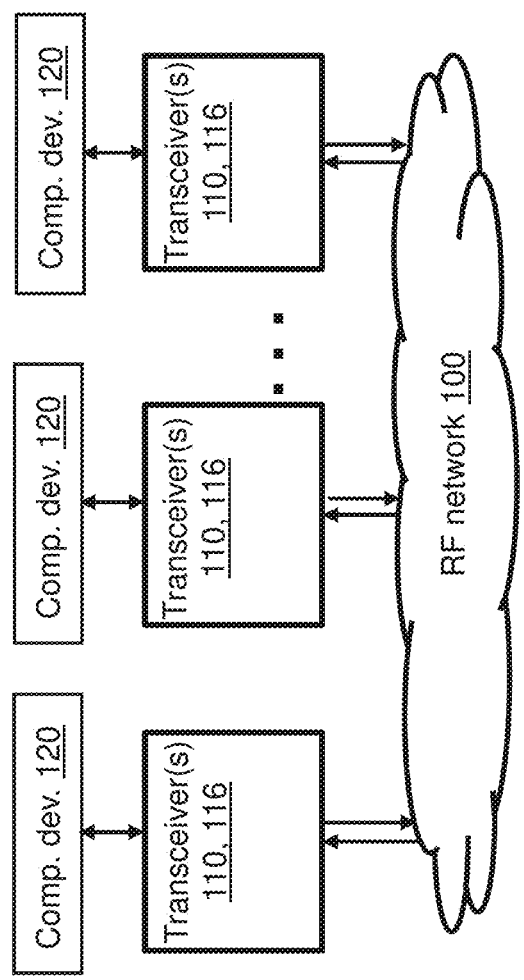
FIG. 7 shows a schematic diagram of interaction between various communication nodes according to further embodiments of the disclosure.

Referring to FIGS. 2 and 7, embodiments of the disclosure can also be implemented in a decentralized setting, i.e., one which does not rely on central radio/agent 400 (FIG. 6). Such a setting may be known as a multi-agent (i.e., multiple transceivers 110, 116, with three or more shown in FIG. 7) wireless scenario. In such a scenario, each transceiver 110, 116 may include or otherwise be coupled to a respective computing device 120 to provide or act as a decentralized decision engine without relying on dictated decisions from a central controller. Although multiple computing devices 120 are shown as an example in FIG. 7, it is understood that multiple computing devices 120 may be coupled to one transceiver 110, 116, and/or that multiple transceiver(s) 110, 116 each may be coupled to a shared computing device 110, 116. A distributed decision making configuration may reduce, or even minimize, the signaling overhead for RF network.

In still further implementations, combinations of the architecture shown in FIG. 6 and the architecture shown in FIG. 7 may be combined to provide a "hybrid learning" platform. In such a setting, RF network 100 may include computing device(s) 120 with decision engines in central radio/agent 400 as well as in one or more of transceiver(s) 110, 116 within RF network 100. In such a scenario, one or more transceiver(s) 100 may take decisions based on a Q-value approximation at in a local portion of RF network 100. At periodic intervals, transceivers) 110, 116 may send a set number of wireless experience tuples to central radio/agent 400, which then may update its machine learning model 240 and communication parameters based on the global experience tuples from transceiver(s) 110, 116 in RF network 100. The updated machine learning model 240 and communication parameters will be then broadcast to more transceiver(s) 110, 116, allowing each recipient to update the local versions of its machine learning model 240 and communication parameters. In such an implementation, machine learning model 240 and/or communication program 220 may be modified to reflect period sending and receiving of updated models across RF network 100, for continuous revision to the decision architecture.

Figure 8:
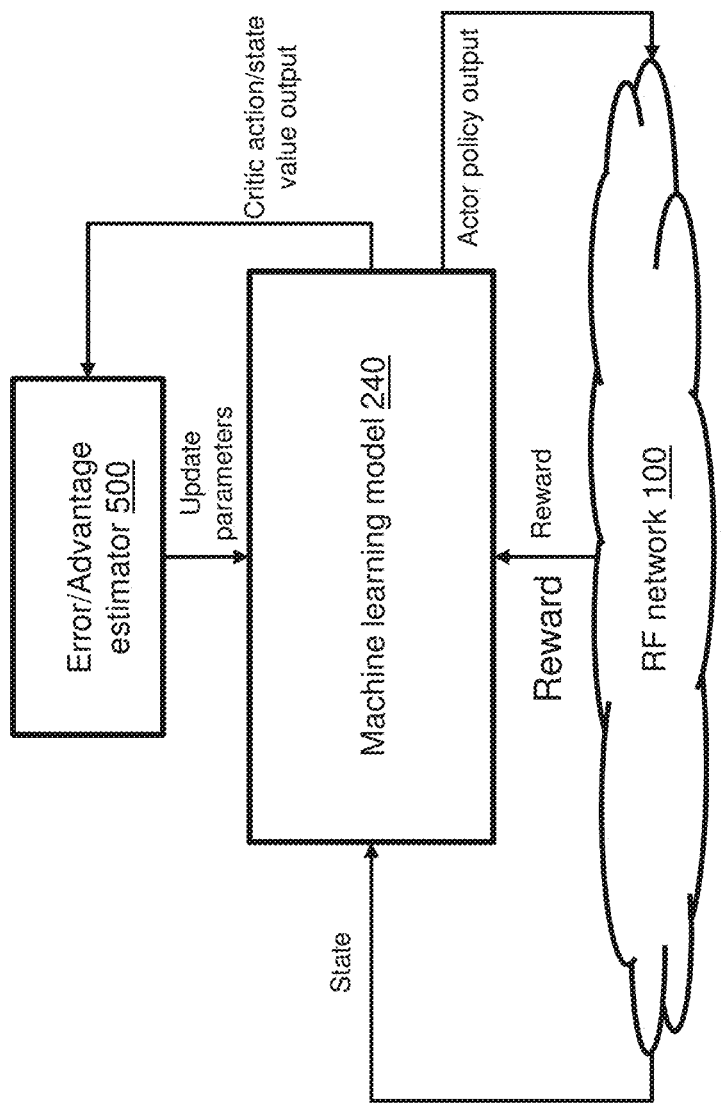
FIG. 8 shows a schematic diagram of interaction between various communication nodes according to additional embodiments of the disclosure.
Figure 9:
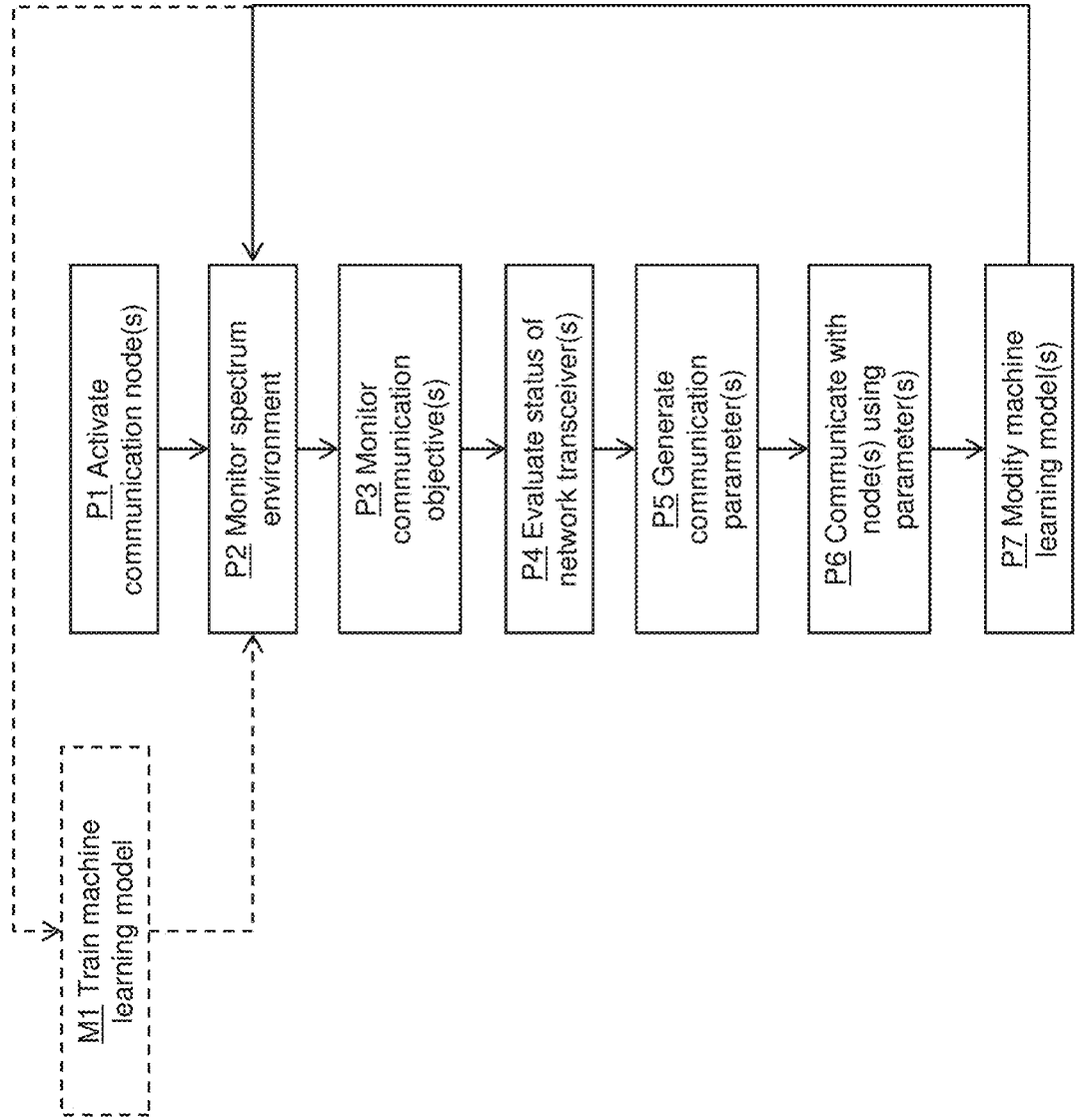
FIG. 9 shows an illustrative flow diagram for implementing various processes in embodiments of the disclosure.

Referring to FIGS. 2, 3, and 8 together, further implementations of the disclosure can provide additional and/or alternative learning approaches to train machine learning model 240. One such approach, depicted in FIG. 8, may include an Actor-Critic learning model. In such a model, each transceiver 110, 116 in RF network 100 may operate machine learning model 240 with two sub-networks designated as an "actor network" and "critic network." These sub-networks alternatively may be implemented as a single network with two outputs corresponding to "actor" and "critic" outputs, or each network may be an independent system in still further implementations. In the case of a single network, machine learning model 240 may include a multi-task learning (MTL) architecture that performs multiple tasks simultaneously as in U.S. patent application Ser. No. 17/213,301, entitled "Multi-task Learning Approach for Automatic Modulation and Wireless Signal Classification" and incorporated herein by reference.

An Actor-Critic methodology may be implemented in machine learning model for RF network 100, e.g., by gathering observations (e.g., sensed parameters and/or network parameters as discussed herein) to characterize the state of RF network 100 at a particular instant. These observations may be provided to the actor and critic aspects of machine learning model 240. The "actor" network then performs policy approximation and chooses the action (i.e., generates the communication parameters) while the "critic" network performs value function approximation and calculates an advantage or temporal difference (TD) error of that action. The example configuration shown in FIG. 8, these aspects of the "critic" network may be embodied as an error/advantage estimator 500 subsystem in communication with machine learning model 240.

In such an implementation, an "advantage" is defined as the gain in terms of the robustness or quality of service provided by the wireless communication (e.g., between transceiver(s) 110, 116, with central radio/agent 400, and/or with other communication nodes). More generally, the advantage refers to an improvement in the actual outcome of communication versus the expected outcome. Conversely, error refers to a deficiency in the actual outcome of communication versus the expected outcome. The actor network updates its policy parameters in the direction guided to by the critic, based on the amount of estimated advantage or error. The critic in this way aids each node in RF network 100 to improve its wireless communication objective(s) whether it be in terms of the data rate, communication range, resiliency, and/or other key performance indicators (KPIs).

The actor-critic learning model may be applied to centralized implementations of RF network 100, e.g., implementations when central radio/agent 400 as shown by example in FIG. 6. In such a setting, central radio/agent 400 can act as a global wireless network trainer such that the distributed transceivers 110, 116 feed a sampled wireless environment to central radio/agent 400. In this case, central radio/agent 400 acts as an autonomous global trainer. In this configuration, central radio/agent 400 observes a set number of states from transceiver(s) 110, 116 in RF network 100. The actor network in central radio/agent 400 provides actions (i.e., generated communication parameters) for each transceiver 110, 116, and the critic network evaluates the value function (i.e., the value of RF network 100 having a particular status) to compute the advantage of the corresponding action. Another learning strategy that can be adopted to develop adaptive self-learning transceivers 110, 116 is the deep deterministic policy gradient (DDPG) approach. DDPG is a model-free, off-policy actor-critic technique whereby transceiver(s) 110, 116 perform soft updates to the actor and critic target network parameters. Here again similar to deep Q-learning, update and target networks are maintained on central radio/agent 400, and/or transceivers 110, 116 where applicable, corresponding to the actor and critic.

Referring now to FIGS. 2-5 and 9, embodiments of the disclosure provide an operational methodology for implementing various aspects of the disclosure provided herein. Process P1 according to the disclosure may include, e.g., activating communication node(s) in the form of transceiver(s) 110, 116, central radio/agent 400 (FIG. 5), and/or other communication devices in RF network 100. Process P1 may include such devices entering a powered on state, or otherwise entering RF network 100 after previously operating outside RF network 100. With communication nodes of RF network 100 in an operational state, process P2 may include monitoring of spectrum environment via transceiver(s) 110, 116 and/or other components. Such monitoring may include, direct measurements via sensor(s) 130, analysis of protocol stack 320, and/or further analysis of transceiver(s) 110, 116 via communication program 220. The methodology thus may continue to process P3, of monitoring any communication objective(s) for RF network 100. Such monitoring may be by way of a direct input from a user of transceiver(s) 110, 116 and/or other devices in RF network 100, and/or may be derived from analysis of the spectrum environment in process P2. Communication objectives for RF network 100 may include, e.g., routing of data packets from one transceiver 110, 116 to another, prioritizing certain forms of communication, maintaining a minimum data flow rate in RF network 100, etc.

Methodologies according to the disclosure may include, in process P4, evaluating the state of RF network 100 based on the monitored spectrum environment and/or communication objective(s). The state of RF network 100 may indicate that certain types of communication (e.g., use of bandwidths, devices, etc.) are favored or disfavored at a given instant in RF network 100. Based on the evaluating in process P5, network control program 206 can generate a set of communication parameters in process P5, e.g., based on machine learning model 240. After generating the communication parameter(s) in process P5, network control program 206 can cause transceiver(s) 110, 116 to communicate with other communication nodes in RF network 100 using the generated parameters. Process P7, which may be implemented after generating the communication parameter(s) in process P5, includes modifying machine learning model(s) 240 based on the results of communicating in process P6. The modifying in process P7 may be based on, e.g., simple comparison between observed and expected aspects of RF network 100, and/or may arise from any machine learning technique described herein (e.g., Q-learning, actor-critic, and/or other examples).

Upon completion of process P7, the methodology may return to process P2 to again monitor the spectrum environment of RF network 100, and subsequent processes P3-P7 to generate communication parameters and modify machine learning model 240. Methods according to the disclosure may optionally include operation M1 for training function approximator machine learning model 240, and/or expanding TDR 242, after process P7 concludes. In cases where transceiver(s) 110, 116 are being used to further train machine learning model 240, operation M1 may include cataloguing the outcome of processes P2-P7 and using such outcomes to further modify machine learning model 240. The training of machine learning model 240 may include, e.g., any machine learning technique described herein (e.g., Q-learning (FIG. 4), actor-critic (FIG. 8), and/or other examples). Thus, operation M1 may be implemented before, after, and/or concurrently with processes P1-7 discussed herein.

Embodiments of the disclosure may provide various technical and commercial advantages. Such advantages may include, e.g., the ability to autonomously generate and implement new communication settings to accommodate vast and unpredictable changes in a given RF network. Such changes may be guided in part by a central radio or agent, and/or may be implemented through a substantial number of transceivers and/or other communication nodes distributed across an area of operation. These advantages may assist operators in accomplishing a wide variety of objectives, such as in wide networking applications, military applications, cellular networks, etc.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be used. A computer readable storage medium may be, for example, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present disclosure may be written in any combination of one or more programming languages, including an object oriented programming language such as Java, Python, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the layout, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As used herein, the term "configured," "configured to" and/or "configured for" can refer to specific-purpose patterns of the component so described. For example, a system or device configured to perform a function can include a computer system or computing device programmed or otherwise modified to perform that specific function. In other cases, program code stored on a computer-readable medium (e.g., storage medium), can be configured to cause at least one computing device to perform functions when that program code is executed on that computing device. In these cases, the arrangement of the program code triggers specific functions in the computing device upon execution. In other examples, a device configured to interact with and/or act upon other components can be specifically shaped and/or designed to effectively interact with and/or act upon those components. In some such circumstances, the device is configured to interact with another component because at least a portion of its shape complements at least a portion of the shape of that other component. In some circumstances, at least a portion of the device is sized to interact with at least a portion of that other component. The physical relationship (e.g., complementary, size-coincident, etc.) between the device and the other component can aid in performing a function, for example, displacement of one or more of the device or other component, engagement of one or more of the device or other component, etc.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for operating a radio frequency (RF) network having a plurality of communication nodes, the system comprising:
    a network transceiver configured to communicate with at least one of the plurality of communication nodes in the RF network;
    a computing device operatively coupled to the network transceiver, and configured to perform actions including:
        evaluating, via a machine learning model, a state of the RF network based on a spectrum environment and a communication objective,
        generating a set of communication parameters based on the state of the RF network,
        causing the network transceiver to communicate with the at least one of the plurality of communication nodes using the generated set of communication parameters, and
        modifying the machine learning model based on a result of causing the network transceiver to communicate with the at least one of the plurality of communication nodes.

2. The system of claim 1, wherein the communication parameters include one or more of a transmission frequency, a transmission waveform, a transmission power, a data destination, or a data rate.

3. The system of claim 1, wherein the computing device is further configured evaluate the state of the RF network based on a protocol stack of at least one of the plurality of communication nodes.

4. The system of claim 3, wherein the sensed parameter includes one or more of a projected signal-to-interference-plus-noise-ratio (SINR), an interference caused to at least one of the plurality of communication nodes in the RF network, a received signal strength, or a queue backlog for at least one of the plurality of communication nodes in the RF network.

5. The system of claim 1, wherein the machine learning model includes a reinforcement learning algorithm implemented on one of the computing device or an external device.

6. The system of claim 1, wherein the computing device is included at least partially within the network transceiver or a base station for the RF network.

7. The system of claim 1, wherein the computing device is operatively coupled to at least one of the plurality of communication nodes in the RF network, and wherein at least one of the plurality of communication nodes includes a network transceiver in a same environment as the network transceiver.

8. The system of claim 1, wherein the computing device is further configured to modify the machine learning model based on an operation by at least one of the plurality of communication nodes.

9. The system of claim 1, wherein the communication objective includes a plurality of communication tasks.

10. A method for operating a radio frequency (RF) network having a plurality of communication nodes, the method comprising:
    evaluating, via a machine learning model, a state of the RF network based on a spectrum environment and a communication objective, wherein the network transceiver is configured to communicate with at least one of the plurality of communication nodes in the RF network,
    generating a set of communication parameters based on the state of the RF network;

causing the network transceiver to communicate with the at least one of the plurality of communication nodes using the generated set of communication parameters; and modifying the machine learning model based on a result of causing the network transceiver to communicate with the at least one of the plurality of communication nodes.

11. The method of claim 10, wherein evaluating the state of the RF network is based on a protocol stack of at least one of the plurality of communication nodes.

12. The method of claim 10, wherein the machine learning model includes a reinforcement learning algorithm implemented on one of the network transceiver or an external device.

13. The method of claim 10, wherein the network transceiver includes a software defined radio (SDR) or a base station within the RF network.

14. The method of claim 10, further comprising modifying the machine learning model based on an operation by at least one of the plurality of communication nodes.

15. The method of claim 10, wherein the communication objective includes a plurality of communication tasks.

16. A program product for operating a radio frequency (RF) network having a plurality of communication nodes, the computer program product comprising a computer readable storage medium on which is stored program code for causing a computer system to perform actions including:

evaluating, via a machine learning model, a state of the RF network based on a spectrum environment and a communication objective, wherein the network transceiver is configured to communicate with at least one of the plurality of communication nodes in the RF network, generating a set of communication parameters based on the state of the RF network;

causing the network transceiver to communicate with the at least one of the plurality of communication nodes using the generated set of communication parameters; and modifying the machine learning model based on a result of causing the network transceiver to communicate with the at least one of the plurality of communication nodes.

17. The program product of claim 16, wherein evaluating the state of the RF network is based on a protocol stack of at least one of the plurality of communication nodes.

18. The program product of claim 16, wherein the machine learning model includes a reinforcement learning algorithm implemented on one of the network transceiver or an external device.

19. The program product of claim 16, further comprising program code for modifying the machine learning model based on an operation by at least one of the plurality of communication nodes.

20. The program product of claim 16, wherein the communication objective includes a plurality of communication tasks.

* * * * *

UNITED STATES PATENT AND TRADEMARK OFFICE
CERTIFICATE OF CORRECTION

PATENT NO. : 11,490,273 B2  
APPLICATION NO. : 17/245156  
DATED : November 1, 2022  
INVENTOR(S) : Jithin Jagannath et al.

Page 1 of 1

It is certified that error appears in the above-identified patent and that said Letters Patent is hereby corrected as shown below:

In the Claims

In Column 20, in Claim 3, Line 28, it reads "...is further configured evaluate the state of the RF network...", but it should read "...is further configured to evaluate the state of the RF network..."

Signed and Sealed this  
Sixth Day of December, 2022

Katherine Kelly Vidal  
*Director of the United States Patent and Trademark Office*